(12) United States Patent
Clark, Jr. et al.

(10) Patent No.: US 12,737,405 B2
(45) Date of Patent: Sep. 15, 2026

(54) GRAPHICAL USER INTERFACE AND PROFILE CONFIGURATION SYSTEM FOR PREDICTING ATTRIBUTES FOR CONTROLLING RECONCILIATION ACTIONS

(71) Applicant: ORACLE INTERNATIONAL CORPORATION, Redwood Shores, CA (US)

(72) Inventors: John D. Clark, Jr., Pepperell, MA (US); Pathanjali Malay, Leawood, KS (US); Timothy K. Gaumont, Mesa, AZ (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/187,363

(22) Filed: Apr. 23, 2025

(65) Prior Publication Data

US 2026/0134021 A1 May 14, 2026

Related U.S. Application Data

(60) Provisional application No. 63/691,497, filed on Sep. 6, 2024.

(51) Int. Cl.
*G06F 16/335* (2019.01)
*G06F 9/46* (2006.01)

(52) U.S. Cl.
CPC ............ *G06F 16/337* (2019.01); *G06F 9/466* (2013.01); *G06F 2209/462* (2013.01)

(58) Field of Classification Search
CPC ... G06F 16/337; G06F 9/466; G06F 2209/462
See application file for complete search history.

(56) References Cited

U.S. PATENT DOCUMENTS

2020/0210867 A1* 7/2020 Banis .................... G06N 20/00
2021/0326717 A1 10/2021 Mueller et al.

(Continued)

OTHER PUBLICATIONS

Munoz, Justin, Mahdi Jalili, and Laleh Tafakori. "Automating Bank Reconciliation Through Graph Representation Learning and Downstream Record Linkage." (Year: 2024).*

(Continued)

*Primary Examiner* — Ann J Lo
*Assistant Examiner* — Mohsen Alman
(74) *Attorney, Agent, or Firm* — Kraguljac Law Group LLC

(57) ABSTRACT

Systems, methods, and other embodiments associated with a profile configuration system are described including with a graphical user interface dashboard for creating a profile and automatically predicting target attributes for the profile with machine learning. The profile may be used by the system to control and guide actions against a database of transactions. For example, an automated machine learning process creates and trains a plurality of candidate machine learning models to predict a value for a target profile attribute. A best-fit machine learning model is selected from the candidates to generate the predicted value for the target profile attribute. Once the profile is created, query logic may be executed to search a database of transactions based on the profile attributes in the profile that match a set of transactions. The matching transactions are then routed and transferred into a reconciliation data table assigned to the account profile.

20 Claims, 5 Drawing Sheets

(56) References Cited

U.S. PATENT DOCUMENTS

| | | | | |
|---|---|---|---|---|
| 2022/0083914 | A1* | 3/2022 | Okamoto | G06N 3/09 |
| 2023/0153634 | A1* | 5/2023 | Wang | G06N 5/022<br>706/11 |
| 2024/0187439 | A1* | 6/2024 | Sand | H04L 63/1433 |
| 2025/0371427 | A1* | 12/2025 | Reddy | G06N 3/09 |

OTHER PUBLICATIONS

Bertomeu J, Cheynel E, Floyd E, Pan W. Using machine learning to detect misstatements. Review of Accounting Studies. (Year: 2021).*

Das S, Huang X, Adeshina S, Yang P, Bachega L. Credit risk modeling with graph machine learning. Informs Journal on Data Science (Year: 2023).*

Steingrimsson, "Oracle AutoML UI at a glance," www.rittmanmead.com/blog/2023/02/oracle-automl-at-a-glance/, Feb. 24, 2023.

* cited by examiner

GRAPHICAL USER INTERFACE AND PROFILE CONFIGURATION SYSTEM FOR PREDICTING ATTRIBUTES FOR CONTROLLING RECONCILIATION ACTIONS

CROSS REFERENCE TO RELATED APPLICATIONS

This disclosure claims the benefit of U.S. Provisional Patent Application Ser. No. 63/691,497 filed Sep. 6, 2024 titled "Machine Learning System to Predict Attributes and Assignments for New Accounts for Reconciliation", inventors: John Clark, Jr. et al. and assigned to the present assignee, which is incorporated by reference herein in its entirety.

BACKGROUND

A profile is a structured data object or record that encapsulates a set of attributes and rules. A software system may have thousands or tens of thousands of different profiles with different combinations of attributes. These profiles serve as configuration templates that control how a system identifies transaction records from a database, categorizes the transactions, and triggers appropriate actions on the transactions, for example, in a reconciliation process.

Manually defining profiles is time-consuming and error-prone, especially in enterprises with thousands of accounts, dynamic organizational structures, and millions of transactions. For a reconciliation process, users must have detailed knowledge of account hierarchies and reconciliation requirements to configure profiles correctly. Profiles with overlapping or conflicting attribute definitions lead to ambiguous reconciliation results or double-counted transactions. Furthermore, some large organizations may have thousands or millions of rows of transaction records that are not linked to or associated with a profile. This causes overall system performance issues when trying to correct and route the transactions to an appropriate processing destination after the fact.

With such vast amounts of profiles and possible attributes in a system, it is impossible for even experienced users to efficiently generate a new profile that has correct attributes and/or does not have conflicting attribute combinations with existing profiles. Conventional systems lack mechanisms to intelligently suggest or generate profile attributes when creating and defining profiles for a system.

SUMMARY

In one embodiment, a computer-implemented method performed by a computing system is described. The method comprises generating and displaying a profile configuration dashboard including a graphical user interface including interactive input fields for defining one or more target profile attributes for prediction in an account profile; wherein the account profile is a data structure that defines at least a plurality of profile attributes and criteria for controlling how transactions associated with account combinations are handled during a reconciliation process.

For a first target attribute defined in the graphical user interface, executing an automated machine learning process including creating and training a plurality of candidate machine learning models from an available set of machine learning models; wherein the training includes training each candidate machine learning model to generate a predicted value for the first target attribute using historical account profiles that contain different combinations of profile attributes associated with different account combinations.

The method may include selecting a best-fit machine learning model from the plurality of candidate machine learning models trained that generates the predicted value for the first target attribute with an accuracy above a threshold; executing the best-fit machine learning model to generate the predicted value for the first target attribute and storing the predicted value in the account profile as one of the plurality of profile attributes and criteria;

When the profile is complete, the method may include executing query logic to search a database of transactions based on the plurality of profile attributes and criteria in the account profile that match a set of transactions; and routing and transferring the matching set of transactions into a reconciliation data table assigned to the account profile.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems and methods are described herein that facilitate automatically predicting attributes for profiles with machine learning models. In one embodiment, a profile configuration system is configured with a graphical user interface dashboard for creating an account profile and automatically predicting target attributes for the account profile with machine learning. The account profile may then be used by the system to control and guide reconciliation actions against a database of transactions.

In one embodiment, an account profile is a structured data object or configuration record. The account profile functions as a metadata container that captures characteristics of an account reconciliation system. For example, the account profile may define profile attributes, criteria, and expected behaviors for how transactions associated with specific account combinations, and/or transactions meeting specific criteria, should be handled by the system during a reconciliation process.

Different account profiles provide instructions to the system for handling different sets of transactions in different ways by triggering specified reconciliation actions, and/or routing sets of transactions into different workflows. The account profile may be used in the context of account reconciliation, for example, for managing new customer account combinations and ensuring accurate financial close processes.

System Overview

Figure 1:
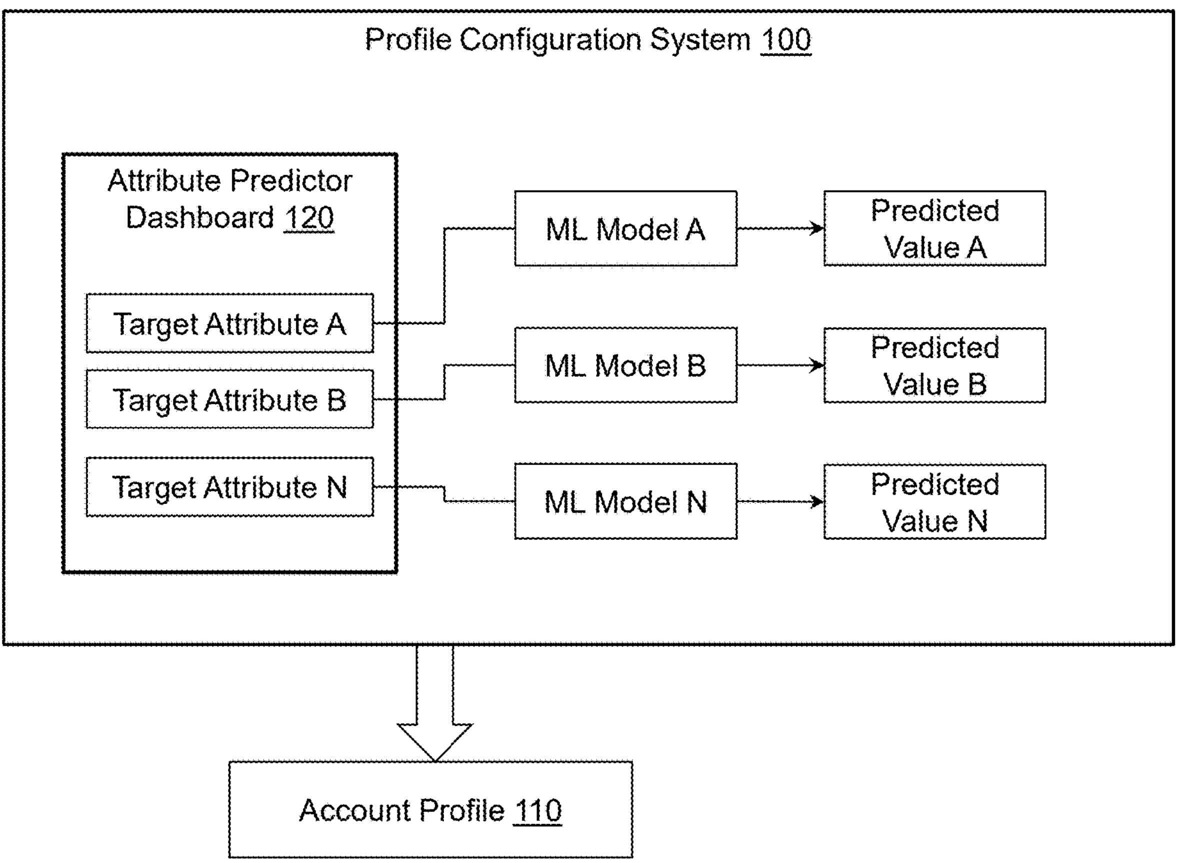
FIG. 1 illustrates one embodiment of a profile configuration system associated with predicting profile attributes and generating a profile.

With reference to FIG. 1, one embodiment of a profile configuration system 100 is illustrated that is associated with creating or modifying an account profile 110 and predicting attributes for the account profile 110.

The profile configuration system 100 may be configured to generate and display a profile configuration dashboard including a graphical user interface (GUI). The GUI may include an attribute predictor dashboard 120 configured to provide interactive input fields for defining profile attributes and identifying one or more target profile attributes (e.g., target attribute A, target attribute B, target attribute N, etc.) that are requested to be predicted. The system 100 is configured to automatically predict a value for each target profile attribute that is requested and store the predicted values in the data structure of the account profile 110.

The GUI may also include input fields for other types of profile attributes to be defined and added to the account profile 110 whose values may be loaded from existing attributes. Upon completion, the account profile 110 will include a plurality of profile attributes and criteria for identifying what transactions the account profile applies to. The account profile 110 is used by the system to function as criteria for reconciliation logic that performs filtering, matching, and/or aggregation of transactions from a database that should be processed in the same manner during reconciliation.

In one embodiment, for a first target attribute A identified in the GUI for prediction, the profile configuration system 100 may execute an automated machine learning process that creates and trains a plurality of machine learning models from an available set of machine learning models. In one embodiment, the automated machine learning process may include AutoML, which is described in more detail below.

For example, the automated machine learning process is configured to train each selected machine learning model to generate a predicted value for the first target attribute using historical account profiles that contain the same type of attribute along with combinations of profile attributes that are associated with different account combinations.

A historical account profile may include attributes such as, but not limited to, an account ID or combination of accounts (e.g., GL account+cost center+business unit); an account type(s), an organizational unit(s), an expected reconciliation method (e.g., balance comparison, transaction matching); assigned user roles (e.g., preparer, reviewer, approver); a risk rating; a reconciliation frequency (e.g., monthly, quarterly); materiality thresholds; source and subsystem associations, key or non-key values for attributes, and so. For example, a key attribute may specify that the attribute is used to uniquely identify or group a reconciliation set. A non-key attribute may specify that the attribute is a supporting field that does not define uniqueness but may still influence reconciliation logic. For example, GL Account attribute (Key) and Currency attribute (Non-Key).

The multiple trained ML models may be tested, validated, and compared to each other for accuracy and confidence levels. The system 100 may then select a best-fit machine learning model from the plurality of machine learning models trained that generates the predicted value for the first target attribute with the highest accuracy or confidence based on a defined threshold. This process may be repeated for each target attribute that is defined by a user in the attribute predictor dashboard 120.

Each target attribute may have an associated best-fit ML model for predicting its attribute value. In FIG. 1, ML model A is shown as the best-fit model for target attribute A, ML model B is shown as the best-fit model for target attribute B, and ML model N is shown as the best-fit model for target attribute N. The trained ML models may be stored and made available for future predictions for when the same profile attribute is identified for prediction in subsequently created account profiles. Thus, in some embodiments, the system 100 may check if a particular type of target attribute already has an existing trained ML model. If the model exists in the available set, it may be selected and the AutoML process may be bypassed.

Once the best-fit ML model is determined for a target attribute, the system executes the best-fit ML model to generate a predicted value for that target attribute. The predicted value may be stored in the account profile 110 as one of the plurality of profile attributes and criteria. In one embodiment, the ML model may also output a confidence value/level reflecting how confident the ML model is with the accuracy of the predicted value (e.g., 92% confident, 50% confident, etc.). The confidence value may also be stored as a field in the account profile 110.

In some embodiments, the system 100 may display the predicted value with its confidence value on the display of the GUI dashboard along with a previous actual value for the same attribute. For example, the GUI dashboard 120 may show a previous month's risk rating attribute and a predictive risk rating value. This allows the user to review the previous actual values side-by-side with the new predicted values, along with the predicted confidence level. The user may then filter and list certain predictions and confidence values.

In another embodiment, the attribute predictor dashboard 120 may include a selectable copy function to copy a selected attribute. The copy function may be defined as a rule that copies a selected target profile attribute to certain account profiles that match the conditions of the rule. For example, risk rating values may be copied by setting up a rule that copies the risk rating either for a defined range of account IDs (e.g., apply to a sub-set of all accounts), or copy the risk rating for all predictions where the confidence level is 90% or higher. That way, the system does not copy any predicted values that do not meet a high confidence threshold. So, the latest close period may include transactions with risk ratings that are a combination of manually loaded values and copied values that have high-confidence predictions.

Once the account profile 110 is defined with attribute values, the account profile 110 may be used (e.g., by reconciliation logic) to identify transactions that match the criteria of the account profile. This may include executing query logic to search a database of transactions based on the plurality of profile attributes and criteria in the account profile that match a set of transactions. The matching set of transactions may then be routed and transferred into a reconciliation data table (e.g., reconciliation bucket) assigned to the account profile 110.

In another embodiment, the attribute predictor dashboard 120 may be configured to allow the user to request the same profile attribute to be predicted in different ways based on a different set of data that the prediction will be based upon. For example, a first risk rating may be predicted based on account balance information. A second version of the risk rating may be defined and predicted based on transaction volume. A third version of the risk rating may be defined and predicted based on account balance and on transaction volume. The user may review the predicted values with their associated confidence values and select one version (e.g., the 3rd version) because it has a higher accuracy/confidence value. The predicted value from the selected version may then be used to copy the predicted value into the risk rating for the account profile.

Another example profile attribute that may be predicted include staff assignments (e.g., workflow attributes) for assigning workers and/or reviewers for the reconciliation of the transactions that meet the criteria of the account profile. This is helpful when the system has a new reconciliation for a new company account combination that has not been processed before. The predicted staff assignment automatically determines which person should work on the new reconciliation rather than having the user (who is creating the account profile) attempt to determine an appropriate assignment.

As an example, an organization may have 2,000 different accounts to track business events and transactions, everything from petty cash and intercompany transfers to receivables from sales, and so on. This makes assigning an appropriate person to reconcile transactions very difficult. In some cases, a large corporation includes multiple companies or legal entities. So among those 2,000 accounts, there may be three different companies.

Reconciliations in this scenario may happen at both the account level and the company level. For example, "Company 1—Account 1" is one reconciliation, "Company 1—Account 2" is another reconciliation, and "Company 3—Account 1" is yet another reconciliation. Not every company uses every account. One company might use 1,000 accounts, while another might use only 500. The rest remain unused by that company, meaning fewer reconciliations are needed for them.

In one case, the system may make a historical prediction. Company 1 has used a specific account consistently for the past year. The system may then predict the next month's value for that account, for example its risk rating, based on historical trends and attributes.

In another case, Company 3 might start using a brand new account, such as Account 50, for the first time. Now, the system wants to predict who should be responsible for reconciling the transactions for Account 50. Should it be the person who handled Account 50 for Companies 1 and 2? Or maybe the person who handled adjacent accounts like Account 49, Account 51, or Account 52. The system takes that information into account and determines, based on historical account profile patterns and similar cases, who is most likely to be assigned to reconcile this new account.

One function of the prediction system is to automatically analyze these relationships and patterns from existing account profiles to make intelligent assignments, while removing manual decisions.

Figure 2:
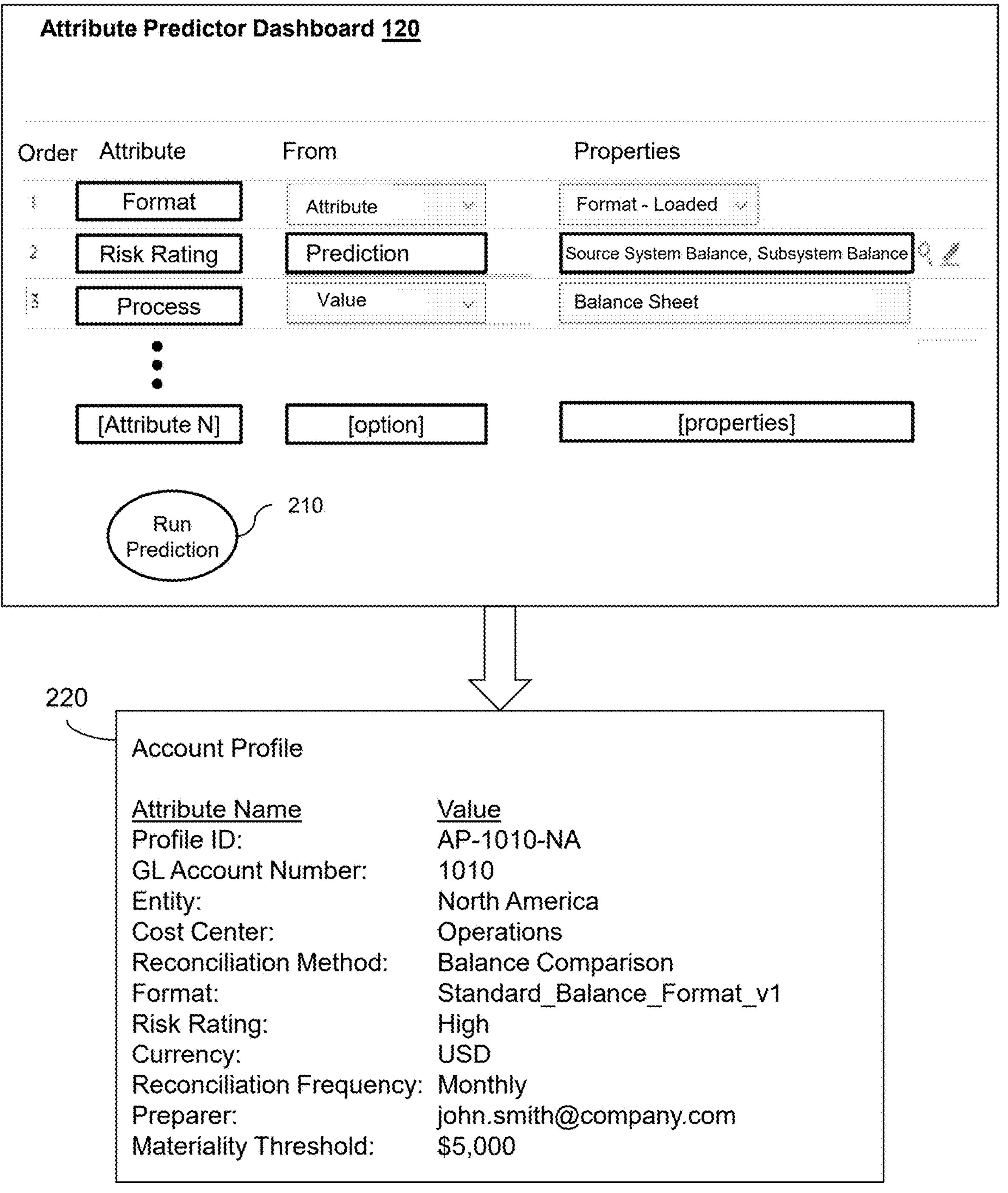
FIG. 2 illustrates one embodiment of an attribute predictor dashboard user interface associated with the profile configure system of FIG. 1.

With reference to FIG. 2, one embodiment of the attribute predictor dashboard 120 is shown as a graphical user interface (GUI). The GUI dashboard illustrates example input fields for identifying and defining target attributes for an account profile. Some attributes may be loaded from previous values or assigned in a specified manner. Other attributes (referred to as target attributes) may be requested to be predicted by the system based on specified properties, for example.

In one embodiment, the input fields in the GUI may include a target attribute selector configured to display names of one or more existing profile attributes from existing account profiles that are available to be selected as a target profile attribute. The GUI dashboard 120 may include a configurable input field configured to allow entry of a name for the target profile attribute (e.g., "Attribute" field). Once target profile attributes are defined for prediction, the GUI dashboard may be configured to pass the target profile attributes from the input fields as a parameter to the automated machine learning process that creates and trains a plurality of machine learning models to generate the predicted value for target profile attribute.

For example, the GUI dashboard 120 may include interactive fields where different attributes may be added to the account profile and modified. The interactive fields may include an "Attribute" field, a "From" field, and a "Properties" field.

In one embodiment, the "Attribute" field identifies the name of the attribute. The "From" field instructs the system from where to obtain the corresponding target attribute value. For example, for the "Format" attribute, the user may request the system to load its value "From" an "Attribute" that already exists, based on conditions or instructions that appear in the associated "Properties" field. The system will obtain this information for the "Format" attribute from information that has been previously loaded, which is designated by an instruction in the "Properties" Field and selected as "Format-Loaded." In one embodiment, a "format" attribute in a profile may refer to the structure or layout of data that the system expects for that particular account or transaction set.

The attribute "Process" is specified to be a "Value." The name refers to a generic attribute that a user may configure any way they wish. For example, it may be used to distinguish between balance sheet or income statement, which is a financial categorization that may be applied to the account profile.

The target attribute named "Risk Rating" identified in the "Attribute" Field is designated by the user to be predicted by the system as indicated by the "Prediction" option specified in the "From" Field. Thus, the user requests the system to perform a "Prediction" on the risk rating attribute using a best-fit ML model as explained previously. The criteria or factors for the risk rating that will be used for the prediction (e.g., what data is the risk rating based on and/or used to make the prediction) may be identified in the "Properties" field. In the example, the risk rating is based on "Source System Balance, Subsystem Balance" values, as designated in the "Properties" field shown in FIG. 2.

In one embodiment, attribute predictions may be executed based on a predefined schedule or date interval. The GUI dashboard 120 may also include a "Run Prediction" option 210 that will automatically initiate the prediction process when selected by the user. When selected, the system activates the trained ML model for the risk rating attribute and executes real-time predictions based on the specified conditions, such as source system balance and subsystem balance as specified in the Properties field.

If an ML model is not yet created or trained for this risk rating attribute, the system will create and train an ML model as previously described in real-time. The training uses historical account information and/or historical reconciliation transactions with a focus on existing risk ratings found in the historical data and the account properties/characteristics associated with those risk ratings.

In general, a risk rating typically reflects factors such as but not limited to: Transaction volume; Monetary value or materiality; Frequency of discrepancies; Historical error rates; Regulatory or audit sensitivity; and Manual overrides or adjustments. The risk rating value may be expressed in different formats, such as but not limited to: a score (e.g., 1 to 5, with 5 being high risk); a category (e.g., Low, Medium, High); and/or a color code (e.g., Green, Yellow, Red).

Thus, even though the risk rating attribute may not have been seen before by the system, the ML model may predict its value based on retrieving existing account profiles (e.g., historical profiles) that have similar attributes and properties as the current account profile being created. For example, the system may identify existing historical profiles that contain the risk rating attribute and have an account balance range within the same range as specified in the new account profile being currently created.

The ML model may compare similar properties between the new account profile and existing account profiles, where the designated properties are selected in the "Properties" Field, for example. During training, the ML model learns patterns of attribute values in account profiles. From these patterns, the ML model may identify a matching or similar existing account profile based on the similar properties that were identified in the input fields for the new account profile.

When the similar existing account profiles are found (e.g., has similar system balance and/or other matching conditions), the ML model reviews the data from the similar existing account profiles and identifies what "risk rating" value was used. That risk rating value may then be used as a predicted risk rating for the new account.

The predicted risk rating may then be populated into the new account profile of the new account. If multiple similar existing accounts are found, each of their risk ratings may be combined, aggregated, or averaged to determine a most likely risk rating as the predicted risk rating for the new account, in one embodiment. This eliminates or at least reduces a number of review and processing steps that were previously performed.

Upon completion, an account profile 220 may be created with a plurality of profile attributes and attribute values. The account profile 220 may be configured in a specified data structure format, for example, but not limited to, J SON, XML, or a config file structure.

Predicting Attributes

Figure 3:
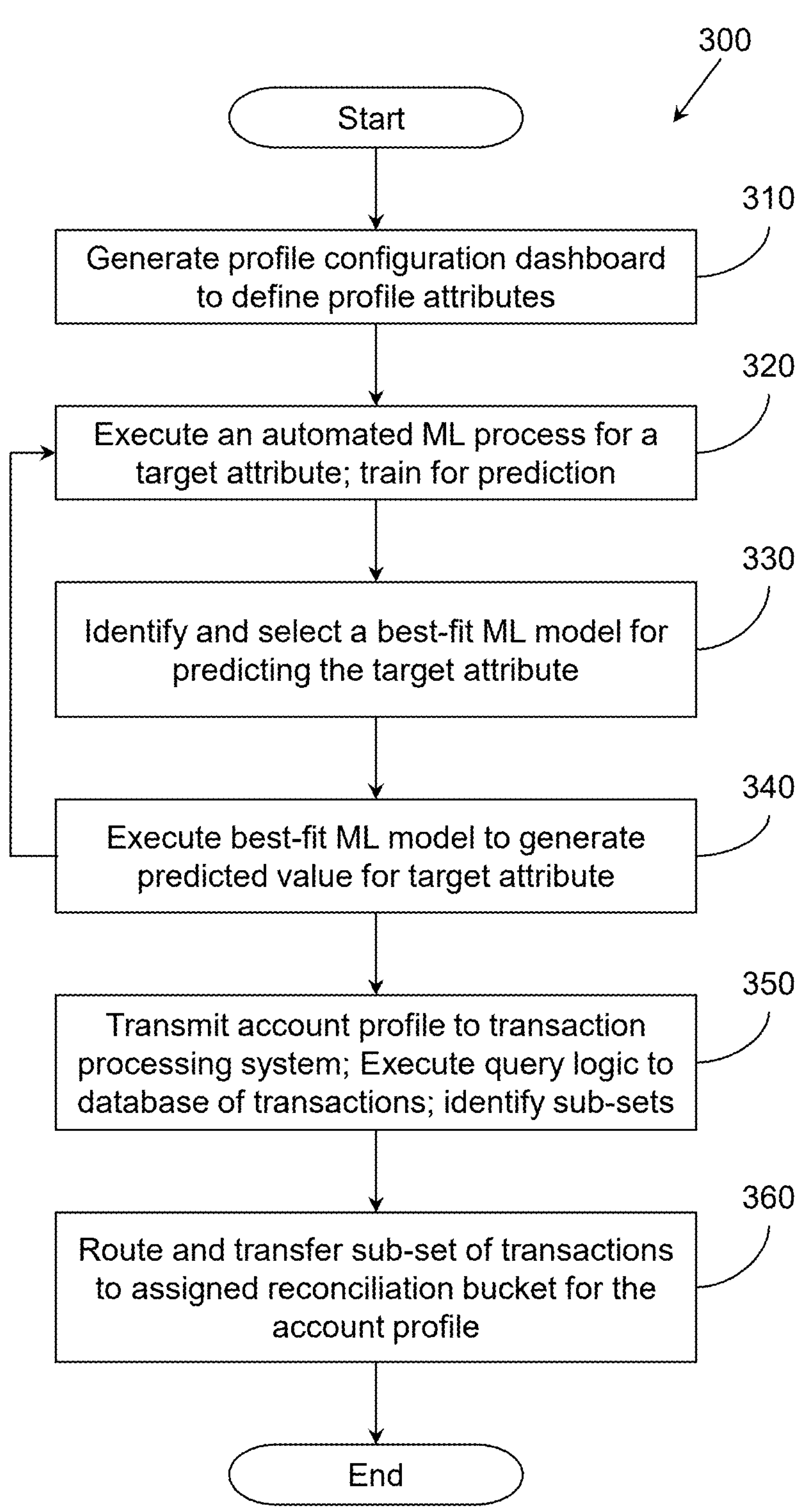
FIG. 3 illustrates one embodiment of prediction method associated with the profile configuration system of FIG. 1.

With reference to FIG. 3, one embodiment of a prediction method 300 is illustrated that is associated with the profile configuration system 100 and attribute predictor dashboard 120 as described above. Method 300 is described with reference to predicting one target profile attribute and the method may be repeated for additional target profile attributes.

At block 310, when the system 100 is initiated to create an account profile, a profile configuration dashboard is generated and displayed on a display of a computing device. The dashboard includes a graphical user interface configured to provide input fields for defining profile attributes as well as one or more target profile attributes for prediction in the account profile. This may be similar to the attribute predictor dashboard 120 shown in FIG. 2, in some embodiments. Here, a "target" profile attribute is an attribute that is requested to be predicted. For example, in FIG. 2, the "Risk Rating" attribute is identified for prediction by the system.

As previously stated, the account profile is a data structure that defines at least a plurality of profile attributes and criteria for controlling how transactions associated with account combinations are handled during a reconciliation process.

At block 320, for a first target attribute defined in the graphical user interface for prediction, the system executes an automated machine learning process that creates and trains a plurality of machine learning models from an available set of machine learning models. The automated machine learning (ML) process may train each machine learning model to generate a predicted value for the first target attribute using historical account profiles that contain different combinations of profile attributes associated with different account combinations.

In one embodiment, the automated ML process may include an AutoML system, which is described below. In another embodiment, the automated ML process may select an existing ML model that has been trained to predict the same type of profile attribute as the first target attribute.

At block 330, the automated ML process selects a best-fit machine learning model from the plurality of machine learning models trained that generates a predicted value for the first target attribute with an accuracy above a threshold. Examples are described with referent to the AutoML embodiment below.

At block 340, the best-fit ML model is executed to generate the predicted value for the first target attribute. The predicted value may also include a confidence value. The predicted value and confidence value may be stored in the account profile as one of the plurality of profile attributes and criteria.

The system may check if there are additional target attributes that are requested for prediction in the account profile. The process may be repeated for each target attribute until predictions are completed and the account profile is finished.

At block 350, once the account profile is created, the system may transmit or pass the account profile as a parameter or input object to a transaction processing system. In one embodiment, the transaction processing system is a reconciliation system. Receiving the new account profile may trigger the reconciliation system to process transactions in accordance with the new account profile.

The account profile may be applied to transactions in one or more databases for a reconciliation process. For example, query logic may be executed that generates and submits queries to search one or more databases of transactions. The query criteria are based on the plurality of profile attributes and criteria in the account profile. One or more queries may be submitted to the databases to match a set of transactions that have corresponding attributes that satisfy the account profile attributes.

In one embodiment, the account profile may be provided to a reconciliation engine, which executes the queries. For example, during a period-end close, the reconciliation engine uses the account profile (along with other account profiles) to identify which accounts/transactions will be reconciled. The reconciliation engine applies the defined account profile attributes as part of reconciliation logic. Using the account profile attribute values, the system may filter, identify, and group a sub-set of transactions that should be reconciled under that account profile. One embodiment of the reconciliation engine is described with reference to FIG. 4.

With continued reference to FIG. 3, at block 360, the matching sub-set of transactions that are identified to match the criteria for the account profile may be routed and transferred into a specified reconciliation data table (e.g., reconciliation bucket) that is assigned to the account profile. Additionally, the reconciliation bucket may be assigned to a particular user to prepare, review, and/or approve the transactions. In this manner, the matching sub-set of transactions are routed to the correct responsible individuals in a workflow for processing the transactions for reconciliation.

With the present system and method, account profiles may be created with predicted attribute values in a more efficient and timely manner that is an improvement over systems that do not predict attribute values. Once ML models are created and predictions are generated (e.g., risk rating applied, staff assignments made . . . ) for an account profile, a reconciliation process can be initiated. Transactions are filtered and transferred to corresponding reconciliation buckets, where the transactions are ready to be processed by the assigned person to review the associated transactions and/or approve them.

In one embodiment, notifications and/or alert messages may be generated and transmitted to the assigned user in real-time when the set of reconciliation transactions are transferred to the assigned reconciliation bucket. The assigned user may see the notifications in a dashboard so they know to initiate the next steps for the transactions and start working on them. The reconciliation transactions may also be transmitted to the assigned user's dashboard and/or the dashboard may provide a network access link to access the assigned reconciliation bucket to work on the transactions.

Automated ML System/Process Embodiment

In one embodiment of block 320 in FIG. 3, a particular ML model may be selected for training from an available set of algorithms (e.g., Random Forest, XGBoost, Neural Nets, etc.). The selected model may be trained as described above.

In another embodiment, the automated machine learning (AutoML) process may be implemented that identifies and selects an optimal (e.g., best-fit) ML model for the type of training data and prediction objective from multiple available ML models. For example, AutoML may be used to automate the end-to-end tasks of applying machine learning to historical account profiles. The AutoML process may include selecting the best ML model for the historical account profile data from multiple available ML models. For example, AutoML automatically searches, builds/trains, and evaluates different ML model algorithms and hyperparameters based on the historical account profiles and how well the ML model makes predictions for an attribute. AutoML compares results of the different ML models and identifies a high-performing model with a high degree of accuracy. In this case, the accuracy relates to accurately predicting a value for the specified type of profile attribute.

For example, the AutoML process may automatically perform the following functions. It may clean and preprocess the historical profile data (e.g., handling missing values, scaling the data, encoding into numerical values, etc.). Relevant features may be selected from the historical account profiles and extracted (e.g., feature engineering and reduction), which creates feature vectors. A feature vector may be a 1-dimensional array of numerical values, in one embodiment.

Using the feature vectors as input, multiple types of candidate models (e.g., Random Forest, XGBoost, Neural Nets, etc.) may be trained and tested. For each candidate model, AutoML may tune hyperparameters using optimization techniques (e.g., grid search, Bayesian optimization, etc.).

Each candidate model may be trained on a portion of the dataset and validated on held-out data using a consistent validation methodology (e.g., k-fold cross-validation or a predefined train/test split). A model's ability to predict the target attribute value is evaluated using a predefined evaluation metric such as accuracy, F1 score, root mean squared error (RMSE), or area under the ROC curve (AUC), depending on the nature of the attribute (categorical or numerical).

The candidate models may be ranked according to their performance on the evaluation metric. In some embodiments, additional factors may be considered, such as inference time, model complexity, or memory footprint. The candidate model achieving the highest score with respect to the evaluation metric is selected as the best-fit model. The best-fit model may then be retrained on a full training dataset and serialized into a deployable format for real-time or batch inference.

In operation, when invoked, the selected best-fit model receives a new input instance comprising current feature values from a new account profile being created, which includes an attribute for prediction. The ML model produces a predicted attribute value for the attribute for use in the new account profile.

ML Model Feedback—Tuning Embodiment

In some embodiments, the profile configuration system 100 may iteratively refine the set of features by analyzing model performance metrics and retrain/tune the ML model with modified feature sets. Model performance metrics provide feedback to the ML model, and model parameters may be updated. Tuning may be performed on a periodic basis. For example, the ML model for predicting an attribute may be tuned based on new feedback data by retraining or fine-tuning the model with updated examples that include corrected labels or corrected outcomes from different historical account profiles and reconciliation processes. This feedback helps the ML model learn from recent mistakes and/or adapt to changing patterns in the data. The retraining/retuning process may involve adjusting model parameters, updating hyperparameters, or incorporating online learning, where the ML model incrementally learns from each new data point. The tuning improves the ML model's accuracy and relevance over time.

Example Operations Based on Account Profiles

Figure 4:
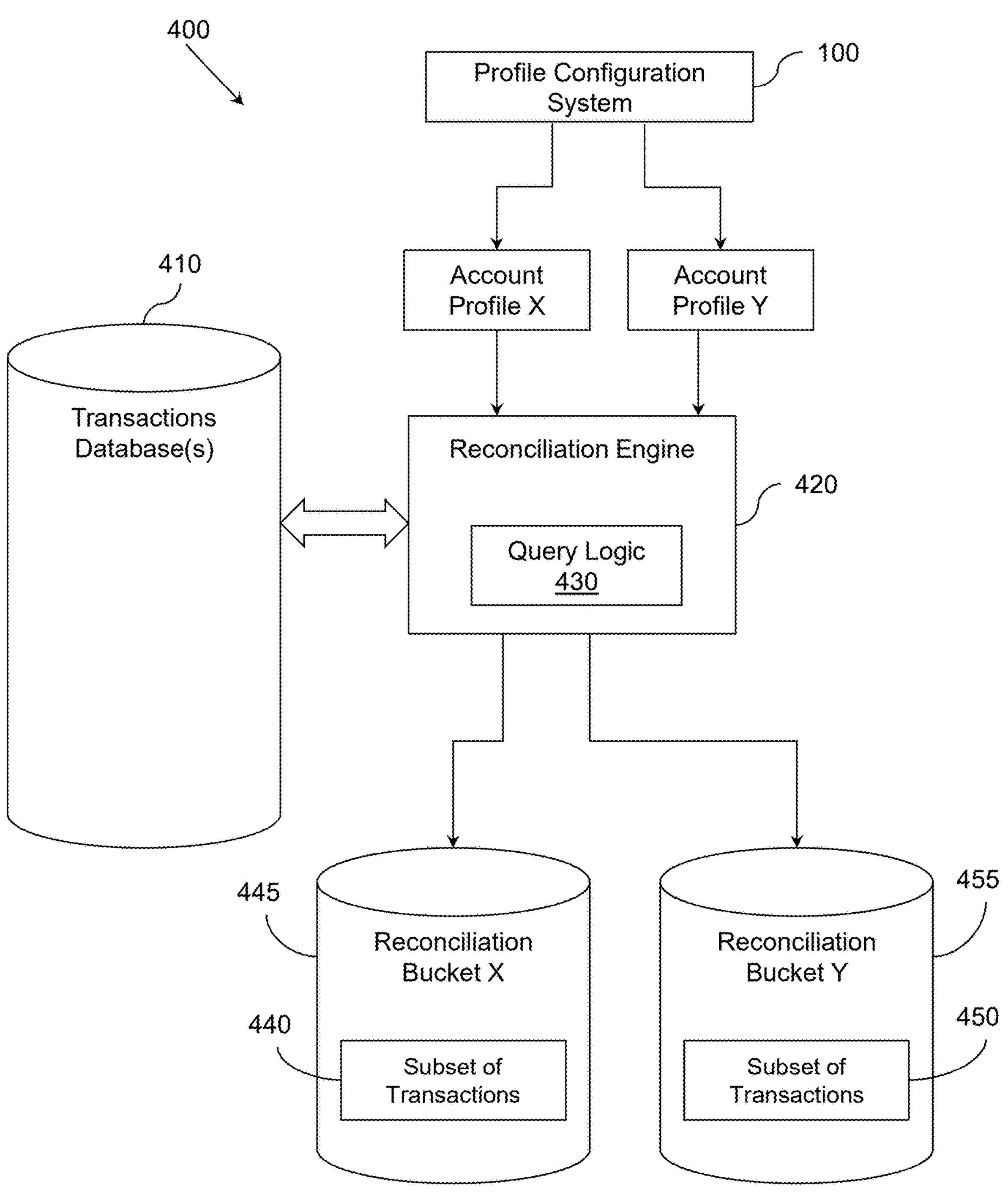
FIG. 4 illustrates one embodiment of configured account profiles used to control a system for processing and routing transactions for reconciliation.

With reference to FIG. 4, one embodiment of a transaction processing system 400 is illustrated that is associated with a reconciliation of transactions based on defined account profiles from the profile configuration system 100. The transaction processing system 400 may have thousands of different account profiles that may be applied to one or more transactions databases 410 at varying times. For simplicity, the following discussion uses two profiles, namely, Account Profile X and Account Profile Y.

Once new account profile X is created by the profile configuration system 100, the system 100 may transmit or pass the account profile X as a parameter or input object to the transaction processing system 400. In one embodiment, the transaction processing system 400 is a reconciliation system, which includes a reconciliation engine 420. Receiving the new account profile X may trigger the reconciliation engine 420 to process transactions in accordance with the new account profile X. A similar process occurs when new account profile Y is received.

In one embodiment, during a period-end close, the reconciliation engine 420 uses account profile X to identify which accounts/transactions will be reconciled in accordance with the profile. For example, the reconciliation engine 420 may use query logic to filter transactions by transforming the profile attributes defined in the account profile X into structured query conditions.

The engine 420 may programmatically build a SQL query, NoSQL filter, or API request based on the profile attributes. This enables the engine 420 to automatically identify which transactions from a larger dataset (e.g., transactions databases 410) are relevant to a specific reconciliation process. The generated query is executed against the transactions databases 410.

The query result set includes a subset of transactions 440 that match or otherwise meet the criteria of the associated account profile X. The result set is routed and transferred to a reconciliation bucket X 445 assigned to or associated with the account profile X.

A similar process is executed for Account Profile Y. The result set of the generated query logic is a subset of transactions 450 that are routed and transferred to a reconciliation bucket Y 455 assigned to or associated with the account profile Y.

In one embodiment, a reconciliation bucket is a logical data container or structured data object used within an accounting software system to group and manage financial transactions or balances that are subject to a common reconciliation process. Each reconciliation bucket is typically associated with a specific account profile, which defines the criteria for how transactions are assigned to that bucket and which individuals are assigned to or responsible for that bucket of transactions.

In another embodiment of the reconciliation engine 420, the engine 420 may be configured to link account profiles to transactions by using one or more levels of matching or rules for matching. For example, in attribute-based matching, a profile contains a defined set of attribute values that act as filters or criteria, as explained. These attributes may include, but are not limited to, General ledger (GL) account number; Entity or business unit; Cost center; Currency; Region; Account type (e.g., bank, AR, AP); Risk Rating, and/or Custom tags or dimensions.

When transactions are loaded into the system, their associated data record includes attributes that represent the transaction. The reconciliation engine 420 may compare the transaction's attributes to profile definitions to determine which profile the transactions belong to. The matching transaction may then be transferred and assigned to the correct profile's reconciliation data group or reconciliation bucket.

In another matching level, the reconciliation engine 420 may use profile criteria or a rules engine. For example, a rules engine may be configured to evaluate each transaction and match the transaction attributes to one or more profiles based on attribute alignment. When a transaction's attributes match to a profile, the system transfers and assigns the transaction to the correct profile's reconciliation data group or reconciliation bucket.

Profiles may also define a specific account combination (e.g., GL account+entity+cost center). Transactions that match this combination are automatically routed to that profile's reconciliation data group or reconciliation bucket for reconciliation.

As a simple example, suppose the system has an account profile called "Cash—North America" with attributes as in Table 1:

TABLE 1

| |
|---|
| Profile Name: "Cash - North America"<br>GL Account Number: 1010<br>Entity: North America<br>Reconciliation Method: Balance Comparison |

Suppose a database system has the following transactions shown in Table 2:

TABLE 2

| Transaction ID | GL Account | Entity | Amount |
|---|---|---|---|
| T001 | 1010 | North America | $500 |
| T002 | 1010 | Europe | $300 |
| T003 | 1010 | North America | $700 |

Based on the attributes of the Profile, Transactions T001 and T003 will be matched to the "Cash-North America" profile and transferred to a reconciliation table/bucket assigned to this profile. Thus, these transactions will be reconciled together. Transaction T002 will match and be transferred to different profile (if a profile exists for attributes GL Account+Entity attributes being 1010+Europe), or the transaction may be flagged as unmatched.

Thus, in general, account profiles are stored as reference records in the system. Transactions may be evaluated via query logic, such as during a data load or reconciliation batch process. The system may use SQL-style joins, index matching, or rule-based lookups to associate transactions to profiles. Once matched, transactions are stored in reconciliation buckets assigned to each profile for further processing, comparison, or user action.

Cloud or Enterprise Embodiments

In one embodiment, the profile prediction system 100 is a computing/data processing system including an application or collection of distributed applications for enterprise organizations. The applications and computing system 100 may be configured to operate with or be implemented as a cloud-based networking system, a software as a service (Saas) architecture, or other type of networked computing solution. In one embodiment, the profile prediction system 100 is a centralized server-side application that provides at least the functions disclosed herein and that is accessed by many users via computing devices/terminals communicating with the computing system 100 (functioning as the server) over a computer network.

In one embodiment, one or more of the components described herein are configured as program modules stored in a non-transitory computer readable medium. The program modules are configured with stored instructions that when executed by at least a processor cause the computing device to perform the corresponding function(s) as described herein.

Computing Device Embodiment

Figure 5:
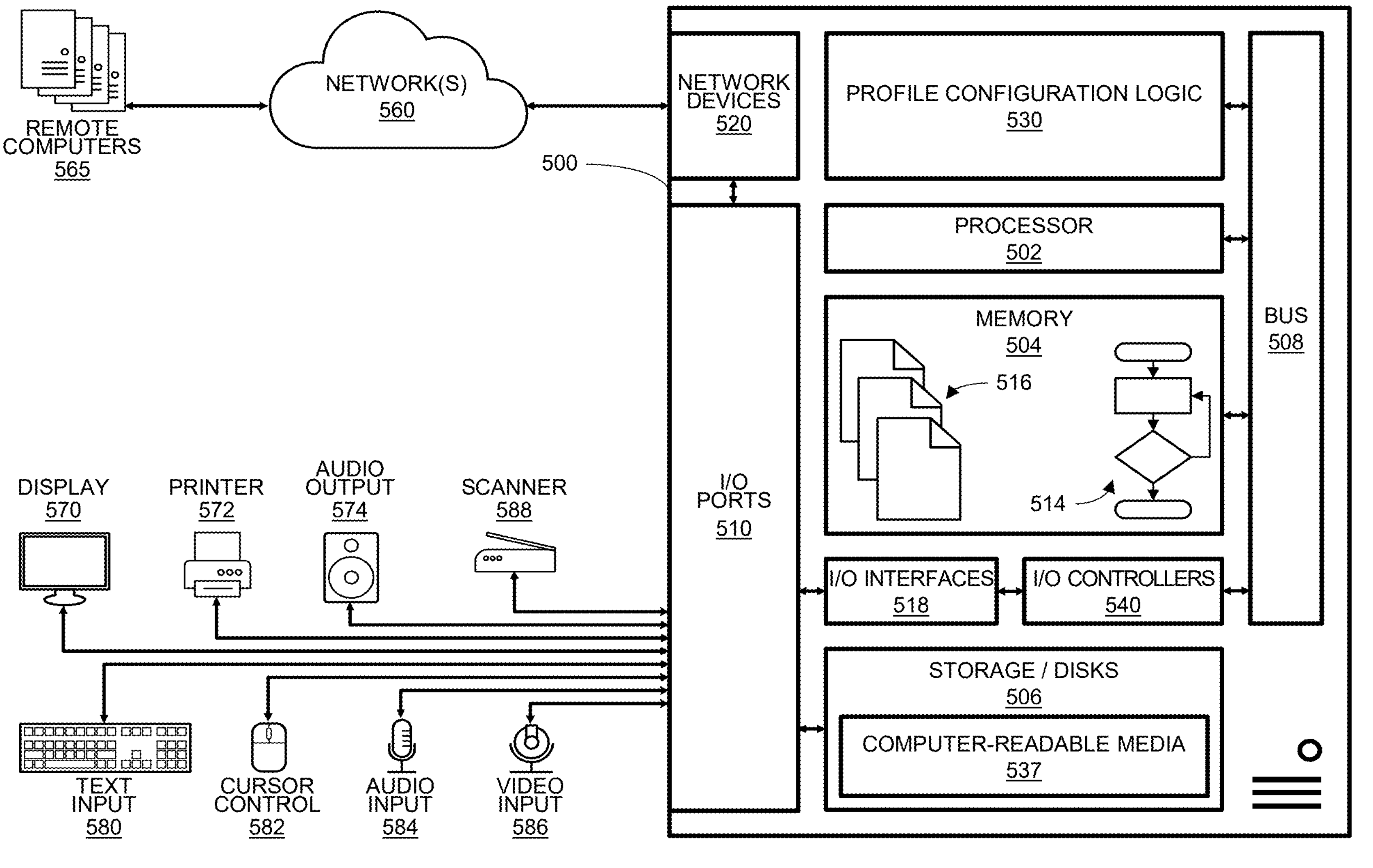
FIG. 5 illustrates an embodiment of a computing system configured with the example systems and/or methods disclosed.

FIG. 5 illustrates an example computing device that is configured and/or programmed as a special purpose computing device with one or more of the example systems and methods described herein, and/or equivalents. The example computing device may be a computer 500 that includes at least one hardware processor 502, a memory 504, and input/output ports 510 operably connected by a bus 508. In one example, the computer 500 may include profile prediction logic 530 configured to facilitate attribute prediction similar to profile prediction system 100 shown in any FIGS. 1-4.

In different examples, the logic 530 may be implemented in hardware, a non-transitory computer-readable medium 537 with stored instructions, firmware, and/or combinations thereof. While the logic 530 is illustrated as a hardware component attached to the bus 508, it is to be appreciated that in other embodiments, the logic 530 could be implemented in the processor 502, stored in memory 504, or stored in disk 506.

In one embodiment, logic 530 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate attribute prediction. The means may also be implemented as stored computer executable instructions that are presented to computer 500 as data 516 that are temporarily stored in memory 504 and then executed by processor 502.

Logic 530 may also provide means (e.g., hardware, non-transitory computer-readable medium that stores executable instructions, firmware) for performing one or more of the disclosed functions and/or combinations of the functions.

Generally describing an example configuration of the computer 500, the processor 502 may be a variety of various processors including dual microprocessors and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A storage disk 506 may be operably connected to the computer 500 via, for example, an input/output (I/O) interface (e.g., card, device) 518 and an input/output port 510 that are controlled by at least an input/output (I/O) controller 540. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The computer 500 may interact with, control, and/or be controlled by input/output (I/O) devices via the input/output (I/O) controller 540, the I/O interfaces 518, and the input/output ports 510. Input/output devices may include, for example, one or more displays 570, printers 572 (such as inkjet, laser, or 3D printers), audio output devices 574 (such as speakers or headphones), text input devices 580 (such as keyboards), cursor control devices 582 for pointing and selection inputs (such as mice, trackballs, touch screens, joysticks, pointing sticks, electronic styluses, electronic pen tablets), audio input devices 584 (such as microphones or external audio players), video input devices 586 (such as video and still cameras, or external video players), image scanners 588, video cards (not shown), disks 506, network devices 520, and so on. The input/output ports 510 may include, for example, serial ports, parallel ports, and USB ports.

The computer 500 can operate in a network environment and thus may be connected to the network devices 520 via the I/O interfaces 518, and/or the I/O ports 510. Through the network devices 520, the computer 500 may interact with a network 560. Through the network, the computer 500 may be logically connected to remote computers 565. Networks with which the computer 500 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (Saas) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions.

An "operable connection", or a connection by which entities are "operably connected", is one in which one or more communication channels are established (or may be established upon request) that allow signals, data, messages, physical communications, and/or logical communications to be sent and/or received between the entities. An operable connection may include a physical interface, an electrical interface, and/or a data interface with one or more transmitters and receivers that communicate with wired and/or wireless signals. An operable connection may include differing combinations of interfaces and/or connections sufficient to establish and allow communication. For example, two entities can be operably connected to communicate signals to each other directly or through one or more intermediate entities (e.g., processor, operating system, logic, non-transitory computer-readable medium, internet communication devices, local network, etc.). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When intended to indicate "only A or B but not both" then the phrase "only A or B but not both" will be used. Thus, use of the term "or" herein is the inclusive, and not the exclusive use.

What is claimed is:

1. A computing system comprising:

one or more computing devices operably connected to communicate over one or more communication networks via one or more network interfaces;

at least one processor connected to at least one memory, wherein the at least one processor is operably connected to at least one of the one or more computing devices; and a non-transitory computer readable medium including instructions stored thereon that when executed by at least the processor cause the computing system to:

generate and display a profile configuration dashboard including a graphical user interface configured to provide input fields for defining one or more target profile attributes for prediction in an account profile;

wherein the account profile is a data structure that defines at least a plurality of profile attributes and criteria for controlling how transactions associated with account combinations are handled during a reconciliation process;

for a first target attribute defined in the graphical user interface, execute an automated machine learning process that creates and trains a plurality of machine learning models from an available set of machine learning models;

wherein the automated machine learning process trains each machine learning model to generate a predicted value for the first target attribute using historical account profiles that contain different combinations of profile attributes associated with different account combinations;

select a best-fit machine learning model from the plurality of machine learning models trained, that generates the predicted value for the first target attribute with an accuracy above a threshold;

execute the best-fit machine learning model to generate the predicted value for the first target attribute and store the predicted value in the account profile as one of the plurality of profile attributes and criteria;

execute query logic to search a database of transactions based on the plurality of profile attributes and criteria in the account profile that match a set of transactions; and route and transfer the matching set of transactions into a reconciliation data table assigned to the account profile.

2. The computing system of claim 1, wherein the graphical user interface is configured to provide a plurality of input fields for selecting a plurality of target profile attributes;

wherein the automated machine learning process is configured to train a plurality of machine learning models to generate a predicted value for each of the plurality of target profile attributes for the account profile;

wherein the computing system is further configured to select a plurality of best-fit machine learning models to generate the predicted values of the plurality of target profile attributes; and generate the account profile to include the predicted values of the plurality of target profile attributes.

3. The computing system of claim 1, wherein the profile configuration dashboard further includes a copy function for configuring a rule that copies a selected target profile attribute to one or more account profiles associated with a defined range of account identifiers, or copies the predicted values for the one or more target profile attributes that have a confidence level above a threshold to a second account profile.

4. The computing system of claim 1, wherein the first target attribute includes a user assignment for reconciliation, wherein the best-fit machine learning model is configured to predict the user assignment associated with the account profile; and wherein the computing system is configured to assign and route the matching set of transactions based on the user assignment.

5. The computing system of claim 1, wherein the input fields in the graphical user interface include a target attribute selector configured to display names of one or more existing profile attributes from existing account profiles that are available to be selected as the target profile attribute;

a configurable input field configured to allow entry of a name for the target profile attribute;

wherein the graphical user interface is configured to pass the target profile attribute from the input fields as a parameter to the automated machine learning process that creates and trains the plurality of machine learning models to generate the predicted value for the target profile attribute; and wherein the best-fit machine learning model is a model from the plurality of machine learning models that achieves an optimal prediction score according to an evaluation metric.

6. The computing system of claim 1, wherein the query logic is configured to identify a subset of transactions from the database of transactions by executing filtering queries on the database of transactions using the plurality of profile attributes and criteria in the account profile.

7. The computing system of claim 1, wherein the computing system further comprises a reconciliation engine that is configured to execute the query logic;

wherein the computing system is configured to transmit the account profile to the reconciliation engine which triggers execution of the query logic; and wherein the query logic is configured to generate a query request based on the profile attributes of the account profile to search the database of transactions.

8. A computer-implemented method performed by a computing system, the method comprising:

generating and displaying a profile configuration dashboard including a graphical user interface including interactive input fields for defining one or more target profile attributes for prediction in an account profile;

wherein the account profile is a data structure that defines at least a plurality of profile attributes and criteria for controlling how transactions associated with account combinations are handled during a reconciliation process;

for a first target attribute defined in the graphical user interface, executing an automated machine learning process including creating and training a plurality of candidate machine learning models from an available set of machine learning models;

wherein the training includes training each candidate machine learning model to generate a predicted value for the first target attribute using historical account profiles that contain different combinations of profile attributes associated with different account combinations;

selecting a best-fit machine learning model, from the plurality of candidate machine learning models trained, that generates the predicted value for the first target attribute with an accuracy above a threshold;

executing the best-fit machine learning model to generate the predicted value for the first target attribute and storing the predicted value in the account profile as one of the plurality of profile attributes and criteria;

executing query logic to search a database of transactions based on the plurality of profile attributes and criteria in the account profile that match a set of transactions; and routing and transferring the matching set of transactions into a reconciliation data table assigned to the account profile.

9. The method of claim 8, wherein the graphical user interface provides a plurality of input fields for identifying a plurality of target profile attributes to be predicted;

training a plurality of candidate machine learning models to generate a predicted value for each of the plurality of target profile attributes for the account profile;

selecting, for each of the plurality of target profile attributes, an individual best-fit machine learning model to generate the predicted value for each of the plurality of target profile attributes; and generating the account profile to include the predicted values of the plurality of target profile attributes.

10. The method of claim 8, further comprising:

providing a copy function for configuring a rule that copies a selected target profile attribute for a defined range of accounts or copies the predicted values for the target profile attributes that have a confidence level above a threshold to a second account profile.

11. The method of claim 8, wherein the first target attribute includes a user assignment for reconciliation, wherein the best-fit machine learning model is configured to predict the user assignment associated with the account profile; and assigning and routing the matching set of transactions to a reconciliation bucket based on the user assignment.

12. The method of claim 8, providing, in the input fields of the graphical user interface, a target attribute selector that displays names of one or more existing profile attributes from existing account profiles that are available to be selected as the target profile attribute;

providing a configurable input field configured to allow entry of a name for the target profile attribute;

wherein the graphical user interface passes the target profile attribute from the input fields as a parameter to the automated machine learning process for creating and training the plurality of candidate machine learning models to generate the predicted value for the target profile attribute; and wherein selecting the best-fit machine learning model includes selecting a model from the plurality of candidate machine learning models that achieves an optimal prediction score according to an evaluation metric.

13. The method of claim 8, wherein executing the query logic includes generating and submitting filtering queries on the database of transactions using the plurality of profile attributes and criteria in the account profile.

14. The method of claim 8, wherein executing the query logic is performed by a reconciliation engine;

wherein the account profile is transmitted to the reconciliation engine which triggers execution of the query logic; and generating, by the query logic, a query request based on the profile attributes of the account profile to search the database of transactions.

15. A non-transitory computer readable medium including instructions stored thereon that when executed by at least one processor of a computing system, cause the computing system to:

generate and display a profile configuration dashboard including a graphical user interface configured to provide input fields for defining one or more target profile attributes for prediction in an account profile;

wherein the account profile is a data structure that defines at least a plurality of profile attributes and criteria for controlling how transactions associated with account combinations are handled during a reconciliation process;

for a first target attribute defined in the graphical user interface, execute an automated machine learning process that creates and trains a plurality of machine learning models from an available set of machine learning models;

wherein the automated machine learning process trains each machine learning model to generate a predicted value for the first target attribute using historical account profiles that contain different combinations of profile attributes associated with different account combinations;

select a best-fit machine learning model, from the plurality of machine learning models trained, that generates the predicted value for the first target attribute with an accuracy above a threshold;

execute the best-fit machine learning model to generate the predicted value for the first target attribute and store the predicted value in the account profile as one of the plurality of profile attributes and criteria;

execute query logic to search a database of transactions based on the plurality of profile attributes and criteria in the account profile that match a set of transactions; and route and transfer the matching set of transactions into a reconciliation data table assigned to the account profile.

16. The non-transitory computer readable medium of claim 15, wherein the graphical user interface is configured to provide a plurality of input fields for selecting a plurality of target profile attributes;

wherein the automated machine learning process is configured to train a plurality of machine learning models to generate a predicted value for each of the plurality of target profile attributes for the account profile;

wherein the computing system is further configured to select a plurality of best-fit machine learning models to generate the predicted values of the plurality of target profile attributes; and generate the account profile to include the predicted values of the plurality of target profile attributes.

17. The non-transitory computer readable medium of claim 15, wherein the profile configuration dashboard further includes a copy function for configuring a rule that copies a selected target profile attribute for a defined range of accounts or copies the predicted values for the target profile attributes that have a confidence level above a threshold to a second account profile.

18. The non-transitory computer readable medium of claim 15, wherein the first target attribute includes a user assignment for reconciliation, wherein the best-fit machine learning model is configured to predict the user assignment associated with the account profile; and wherein the computing system is configured to assign and route the matching set of transactions based on the user assignment.

19. The non-transitory computer readable medium of claim 15, wherein the input fields in the graphical user interface include a target attribute selector configured to display names of one or more existing profile attributes from existing account profiles that are available to be selected as the target profile attribute;

wherein the input fields in the graphical user interface include a configurable input field configured to allow entry of a name for the target profile attribute;

wherein the graphical user interface is configured to pass the target profile attribute from the input fields as a parameter to the automated machine learning process that creates and trains the plurality of machine learning models to generate the predicted value for the target profile attribute; and wherein the best-fit machine learning model is a model from the plurality of machine learning models that achieves an optimal prediction score according to an evaluation metric.

20. The non-transitory computer readable medium of claim 15, wherein the computing system further comprises a reconciliation engine that is configured to execute the query logic;

wherein the computing system is configured to transmit the account profile to the reconciliation engine which triggers execution of the query logic; and wherein the query logic is configured to generate a query request based on the profile attributes of the account profile to search the database of transactions.

* * * * *